(12) United States Patent
Kohls

(10) Patent No.: US 7,726,724 B2
(45) Date of Patent: Jun. 1, 2010

(54) AERODYNAMIC DEVICE AND METHOD OF USE

(76) Inventor: Stephen Kohls, 66 Sunset Trail, Queensbury, NY (US) 12804

( * ) Notice: Subject to any disclaimer, the term of this patent is extended or adjusted under 35 U.S.C. 154(b) by 40 days.

(21) Appl. No.: 11/869,799

(22) Filed: Oct. 10, 2007

(65) Prior Publication Data
US 2009/0096250 A1 Apr. 16, 2009

(51) Int. Cl.
*B62D 35/00* (2006.01)
(52) U.S. Cl. .................. 296/180.1; 296/180.4
(58) Field of Classification Search ............. 296/180.1, 296/180.4, 3; 180/903
See application file for complete search history.

(56) References Cited

U.S. PATENT DOCUMENTS

| | | | |
|---|---|---|---|
| 4,142,755 A | 3/1979 | Keedy | |
| 4,214,787 A | 7/1980 | Chain | |
| 4,257,641 A | 3/1981 | Keedy | |
| 4,508,380 A | 4/1985 | Sankrithi | |
| 4,601,508 A | 7/1986 | Kerian | |
| 4,688,841 A | 8/1987 | Moore | |
| 4,702,509 A | 10/1987 | Elliott, Sr. | |
| 4,741,569 A | 5/1988 | Sutphen | |
| 4,818,015 A | 4/1989 | Scanlon | |
| 5,058,945 A | 10/1991 | Elliott, Sr. et al. | |
| 5,240,306 A | 8/1993 | Flemming | |
| 5,348,366 A | 9/1994 | Baker et al. | |
| 5,498,059 A | 3/1996 | Switlik | |
| 5,782,521 A | 7/1998 | Anderson | |
| 5,823,610 A | 10/1998 | Ryan et al. | |
| 6,092,861 A | 7/2000 | Whelan | |
| 6,257,654 B1 | 7/2001 | Boivin et al. | |
| 6,309,010 B1 * | 10/2001 | Whitten | 296/180.4 |
| 6,409,252 B1 | 6/2002 | Andrus | |
| 6,467,833 B1 * | 10/2002 | Travers | 296/180.4 |
| 6,485,087 B1 | 11/2002 | Roberge et al. | |
| 6,595,578 B1 | 7/2003 | Calsoyds et al. | |
| 6,669,270 B1 | 12/2003 | Card et al. | |
| 6,685,256 B1 | 2/2004 | Shermer | |
| 6,789,839 B1 | 9/2004 | Samuelson | |
| 6,799,791 B2 | 10/2004 | Reiman et al. | |
| 6,877,793 B2 | 4/2005 | Cory | |
| 7,207,620 B2 | 4/2007 | Cosgrove et al. | |
| 7,374,230 B2 * | 5/2008 | Breidenbach | 296/180.4 |
| 7,513,548 B1 * | 4/2009 | Win | 296/3 |

* cited by examiner

*Primary Examiner*—Patricia L Engle
*Assistant Examiner*—Pinel E Romain
(74) *Attorney, Agent, or Firm*—Wood, Herron & Evans, LLP

(57) ABSTRACT

An aerodynamic device is disclosed for limiting aerodynamic drag on the rear surface of various types of trucks with trailers. The aerodynamic device includes a plurality of rigid members and a flexible sheet designed to create a pyramid-shaped projection pointing away from the rear surface of the trailer. The device members can be quickly disassembled and the flexible sheet collapses so that the aerodynamic device lies flat against the rear surface of the trailer. The aerodynamic device can be attached directly to doors on the rear surface of a trailer or to a mounting frame that may rotate around to the side of the trailer where a roll-up style door is present.

13 Claims, 6 Drawing Sheets

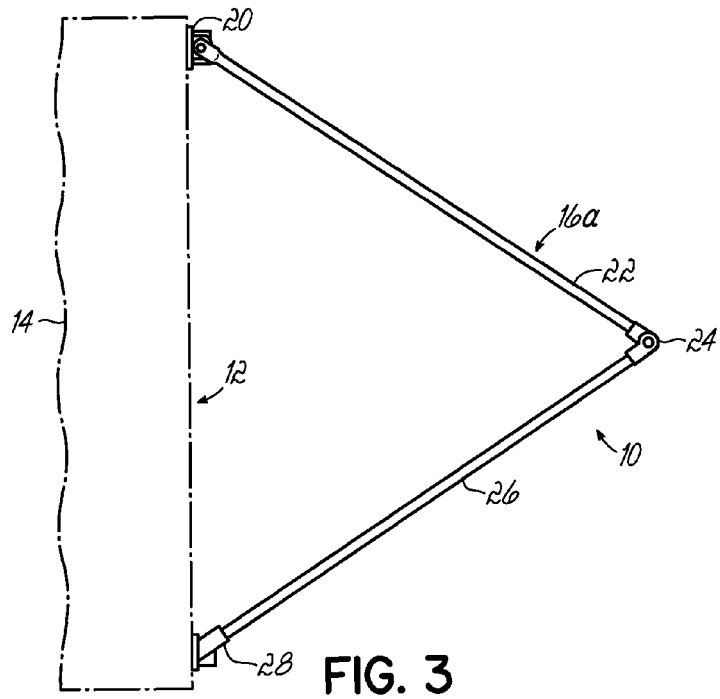
FIG. 3
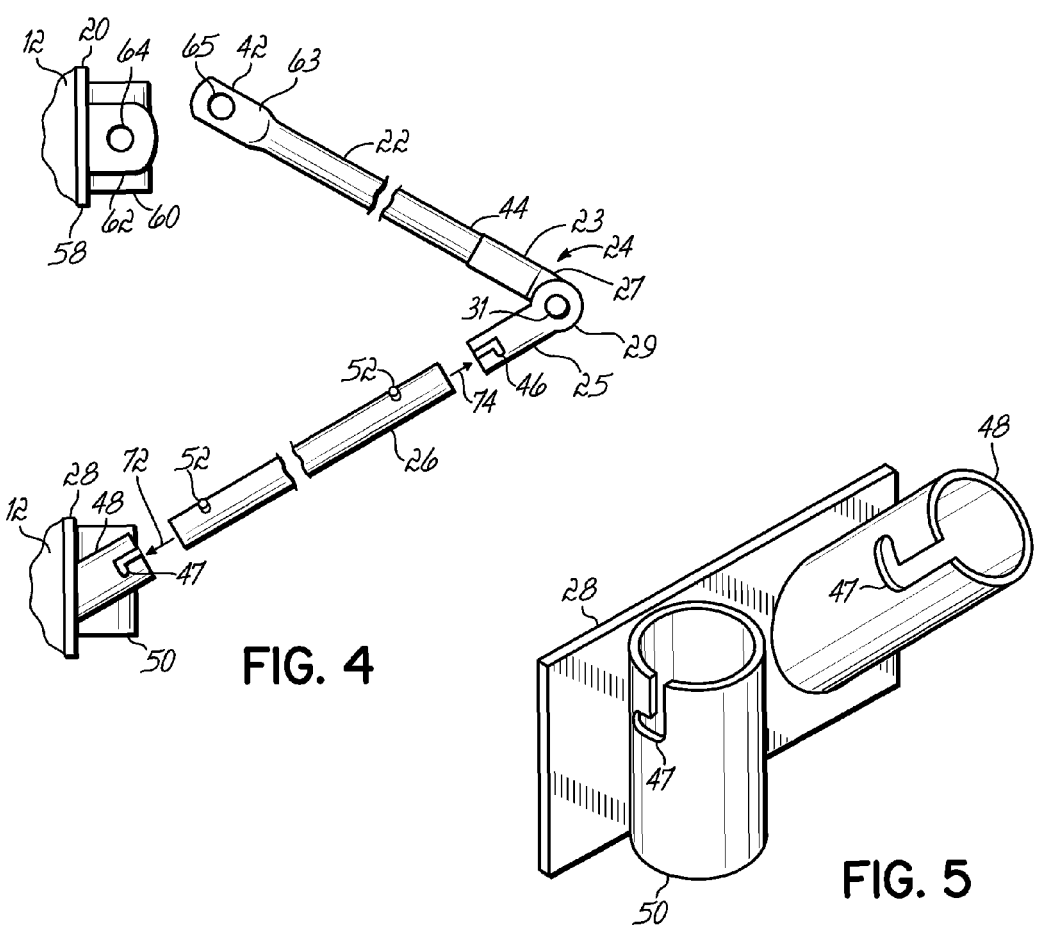
FIG. 4
FIG. 5

AERODYNAMIC DEVICE AND METHOD OF USE

FIELD OF THE INVENTION

This invention relates to an aerodynamic device for use on vehicles such as trucks with trailers, and more specifically to a deployable structure that is easily assembled to improve the fuel efficiency of a vehicle and easily disassembled and stored unobtrusively on the vehicle when the device is not in use.

BACKGROUND

The design of a vehicle has typically been governed, at least in part, by both cosmetic and utilitarian considerations. Cosmetic-based design features are intended to enhance the visual appeal of a vehicle to the consuming public. Utilitarian-based features, on the other hand, are designed to achieve the intended purpose of the vehicle. For example, the engine and vehicle size are determined, in part, by how many passengers the vehicle will carry, or what size load will be transported. In recent years, cosmetic and utilitarian concerns have merged to increase focus on preserving cosmetic appeal, while also making the vehicles more efficient so as to reduce fuel costs.

The amount of power needed to move a vehicle increases as a function of the vehicle speed because of aerodynamic drag. The amount of power necessary to overcome that increased drag directly translates to increased fuel consumption, and thus increased cost of operation. In the United States trucking industry, an estimated 1.7 million trucks use 23 billion gallons of diesel fuel every year, and 65-70% of the energy expended in fuel is to overcome aerodynamic drag on the truck and trailer. Many aerodynamic improvements have been made to the front sides of trucks and trailers to minimize costly aerodynamic drag. These improvements have helped the average fuel economy in the trucking industry rise from 4.5 miles per gallon in the 1980's to approximately 6 miles per gallon today.

While those aerodynamic design improvements at the front of a truck and trailer have resulted in some improvement to fuel economy, aerodynamic drag remains a costly problem. This problem is exacerbated by the typical design of the back end of most trailers, which is vertically squared-off. This squared-off rear end creates significant drag on the vehicle, which consumes large amounts of fuel. As with any vehicle, when the trailer body moves through the air, a mass of air is displaced and must flow around the trailer. As the air flows toward the squared-off back end of a trailer, an area of low pressure is created. This area causes a sudden, high-energy, chaotic inrush of turbulent air which creates drag on the rear of the trailer.

Aerodynamic drag reduction systems in the prior art have not been widely accepted or commercially successful in the trucking industry. The most significant drawbacks in almost all known systems are the following: (1) the complicated processes for installing the systems on a vehicle, (2) the need to permanently modify the vehicle to install the system, (3) the functional difficulties added by the installation and operation of the device such as unloading and loading for trucks with trailers, and (4) the time-consuming nature of deploying and stowing the systems at each loading or unloading station.

While many solutions to improve the aerodynamic drag at the rear of the truck and trailer have been suggested, none have been widely adopted in the United States by trailer manufacturers or trucking companies. Various reasons have caused this dilemma. First, trailer manufacturers generally design a trailer to maximize its interior cargo space given fixed external dimensions mandated by federal highway regulations. Consequently, aerodynamic design is not the manufacturer's primary design concern. Second, trailers are often loaded and unloaded at loading docks which require the driver to back the trailer up flush against the loading dock. Any aerodynamic device, therefore, must be easily removable or repositionable to ensure flush loading with the dock.

There is clearly room for improvement in aerodynamic devices for trailers to overcome the above-mentioned issues. For instance, it would be desirable to create an aerodynamic device that significantly reduces the aerodynamic drag on a trailer caused by the squared-off back end of the trailer. Such a device should also be quick and easy to collapse or deploy during load transfers. It would also be desirable to create such a device inexpensively in order to entice the trucking industry to adopt widespread use of this device.

SUMMARY OF THE INVENTION

The invention relates to an aerodynamic device for mounting on the rear surface of vehicles such as trucks with trailers. The aerodynamic device comprises two device halves that create a pyramidal shape when the apparatus is deployed. This pyramidal shape lowers aerodynamic drag because it eliminates the sharp change in direction the air experiences as it passes beyond the end of the trailer's sides and roof. This reduces an area of low pressure at the rear of those vehicles which would otherwise cause turbulent air disturbances and aerodynamic drag.

One embodiment of this invention includes device halves which each comprise an upper support member and a lower support member that are rigid bars with first and second ends, an angled connection element to couple the second ends of each support member, upper and lower anchor elements attached to the rear surface of the vehicle for coupling the first ends of the support members to the perimeter of the rear surface, and a flexible sheet connected to the perimeter of the rear surface and the support members to create a half-pyramid. The upper anchor element is a hinge-style joint allowing the upper support member to pivot only in a vertical plane transverse to the rear surface of the vehicle. The angled connection element and the lower anchor element both have pin slots for quick insertion and locking of the lower support member which has pins on both ends.

A method for installing a device half of this embodiment is also disclosed. First the flexible sheet is affixed to a portion of the upper support member, and the first end of the upper support member is connected to the upper perimeter of the rear surface of the vehicle. Similarly, the flexible sheet is next affixed to a portion of the lower support member, and the first end of the lower support member is connected to the lower perimeter of the rear surface. Then the second ends of the upper and lower support members are connected to each other. Finally, the flexible sheet is connected to the upper and lower perimeter of the rear surface to create a half-pyramid shape.

Another embodiment is adapted to work with vehicles such as trucks and trailers with roll-up style doors instead of two vertically-hinged doors. With this door style, the anchor elements cannot be attached directly to the door. Instead, two mounting frames are installed around the perimeter of the rear surface and all the elements of one device half of the above-described embodiment are attached to the mounting frames. These mounting frames are U-shaped frames that hinge around the side edge of the rear surface of the trailer. The mounting frames also have brackets installed on the rear and side surfaces of the trailer to hold a vertical bar portion of the frame in place against the rear surface or side surface of the trailer. All the remaining structural elements are generally the same as the above-described embodiment, but the anchor elements and the flexible sheet connection points are all on the mounting frame instead of the doors. When the aerodynamic device is retracted or stowed away flat against the rear surface of the vehicle, the mounting frame can then be rotated 270 degrees around the rear surface's side edge and coupled to the brackets on the side surface. The truck can then back up flush against a loading ramp and the roll-up door is completely unimpeded.

Still another embodiment is designed for use on roll-up style doors. This embodiment is comprised of a single unit instead of the two device halves of the other embodiments. In this embodiment, the mounting frame is a U-shaped frame which hinges around a side edge of the rear surface. Unlike the earlier-described U-shaped frame, the frame extends to cover the entire rear surface instead of just half. The remaining structural elements of this embodiment are generally the same as those in one device half of the other embodiments, with the exception that the flexible sheet is bigger to create a full pyramid when the apparatus is deployed instead of just half a pyramid. Just as in the embodiment with mounting frames described above, the anchor elements and flexible sheet are all coupled to the mounting frame instead of the rear surface of the vehicle. A set of brackets located on the rear surface and side surface of the vehicle are used to hold the mounting frame in different positions depending on whether the device is deployed or retracted. This embodiment deploys and retracts substantially like the above-described embodiments, but with fewer structural elements.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

FIG. 3 is a side view of one half of the aerodynamic device of FIG. 1 without the flexible sheet.

FIG. 4 is an exploded view showing the structural elements of a device half.

FIG. 5 is a perspective view of a lower anchor element.

DETAILED DESCRIPTION

Figure 1:
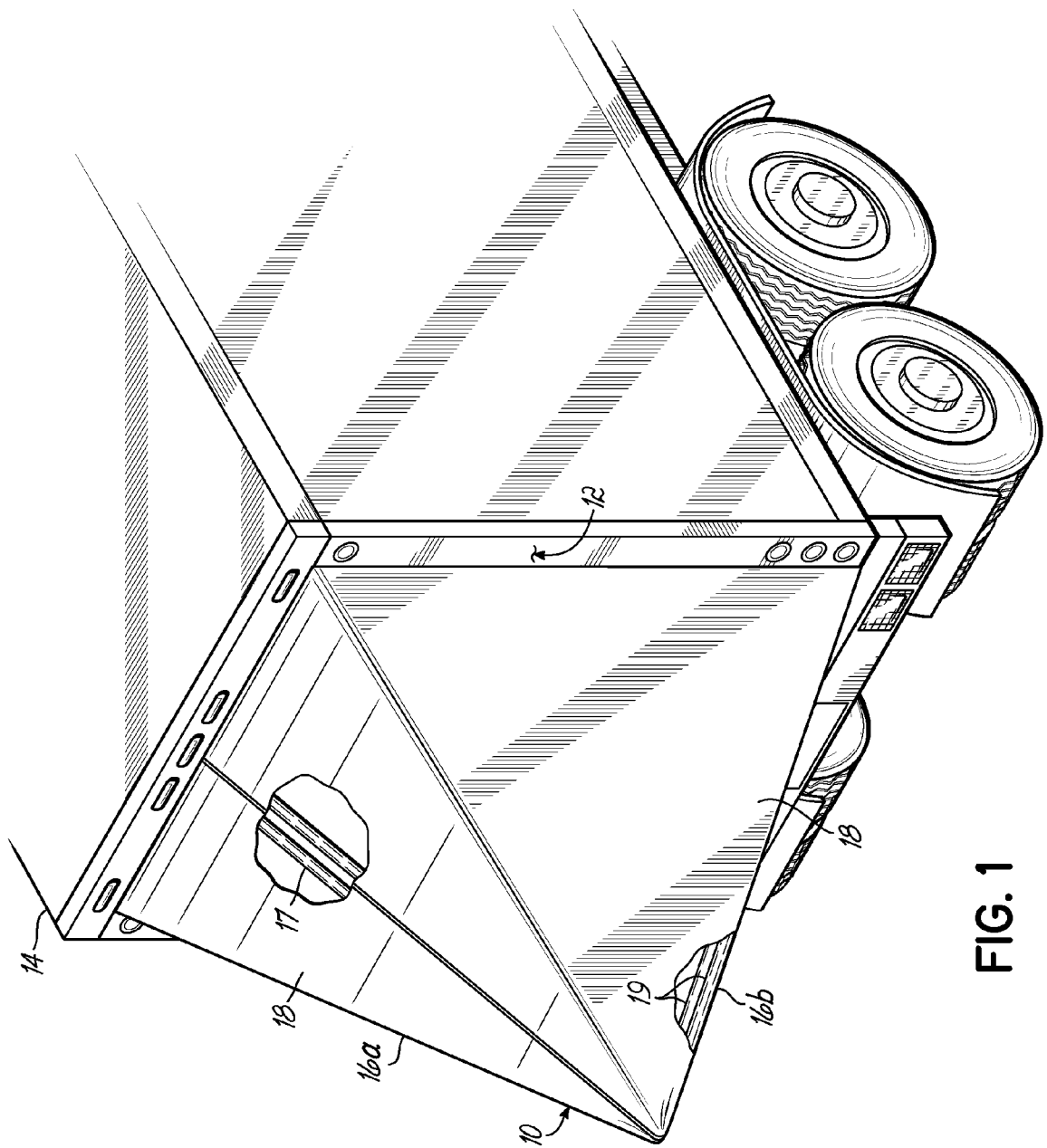
FIG. 1 is a perspective view of an aerodynamic device according to one embodiment of the invention attached to the rear surface of a trailer.

One embodiment of the invention is shown in FIGS. 1-6 with an aerodynamic device 10 attached to a rear surface 12 of a vehicle 14. As illustrated, the vehicle 14 is a trailer with two doors 13 hingedly attached to the rear surface 12 so that they can open outward from the center of the rear surface 12 and swing back along the sides of the trailer. It will be appreciated that this embodiment could be used for other cargo transport vehicles. FIG. 1 shows how the aerodynamic device 10 appears when it is being used. The device 10 has two device halves 16a, 16b that are each covered by a flexible sheet 18. Collectively, the two device halves 16a, 16b form a generally pyramidal shape. Although it is not shown in this embodiment, a connector or coupling device could be used near the outward point of the pyramid to hold the two device halves 16a, 16b together.

Figure 2:
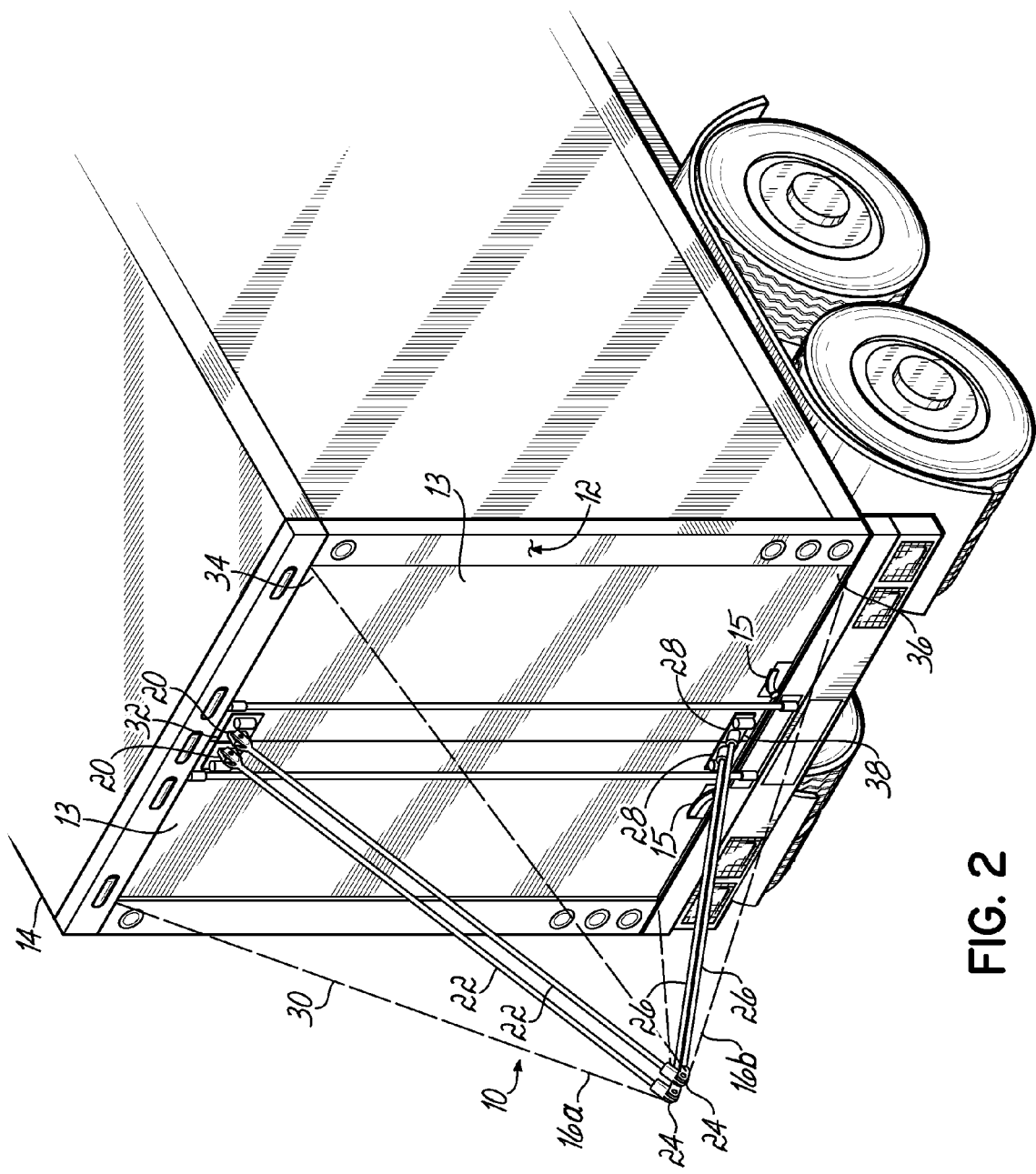
FIG. 2 is a perspective view of the aerodynamic device of FIG. 1 showing the interior components of each device half.

FIG. 2 shows the interior structural elements of the aerodynamic device 10 without the flexible sheet 18. Each device half 16a, 16b comprises an upper anchor element 20 attached to a door 13 on the rear surface 12, an upper rigid member 22 coupled to the upper anchor element 20, an angled connection element 24 coupled to the upper rigid member 22, a lower rigid member 26 coupled to the angled connection element 24, and a lower anchor element 28 which couples the lower rigid member 26 to the rear surface 12. A partial outline of the flexible sheet 18 is shown by dashed lines 30 in FIG. 2.

A side view of the aerodynamic device 10 is shown in FIG. 3 as it would look deployed without the flexible sheet 18. As can be seen in the one visible device half 16a of FIG. 3, the upper rigid member 22 and the lower rigid member 26 are approximately as long as the distance between the upper anchor element 20 and the lower anchor element 28. This configuration creates an approximate equilateral triangle with sides being the upper rigid member 22, the lower rigid member 26, and the rear surface 12 of the vehicle 14.

As shown in FIGS. 1-2, the flexible sheet 18 for one device half 16b is attached around the perimeter of the door or rear surface 12 at certain points 32, 34, 36, 38. The flexible sheet 18 can be made of any suitable material such as weatherproof durable fabric. The flexible sheet 18 is generally fixedly attached to the rear surface 12 at the points 32, 34, 36 so as not readily removed. In contrast, the flexible sheet 18 is easily detachable from the rear surface 12 at point 38 near the door handles 15 to allow ready access to the door handles 15. This removable connection point 38 also allows for access to the interior structural elements when needed to deploy or retract the aerodynamic device 10. More connection points around the perimeter of the rear surface 12 can also be added to further secure the flexible sheet 18 to the vehicle 14. It will be appreciated that the flexible sheet 18 may also be easily detachable from the rear surface 12 at points 32, 34, 36 to permit access to other areas of the rear surface 12. In this embodiment, the flexible sheet 18 further comprises two interior sleeves 17, 19 that fit respectively around the upper rigid member 22 and the lower rigid member 26. These interior sleeves 17, 19 hold the flexible sheet 18 in a proper orientation.

Figure 6:
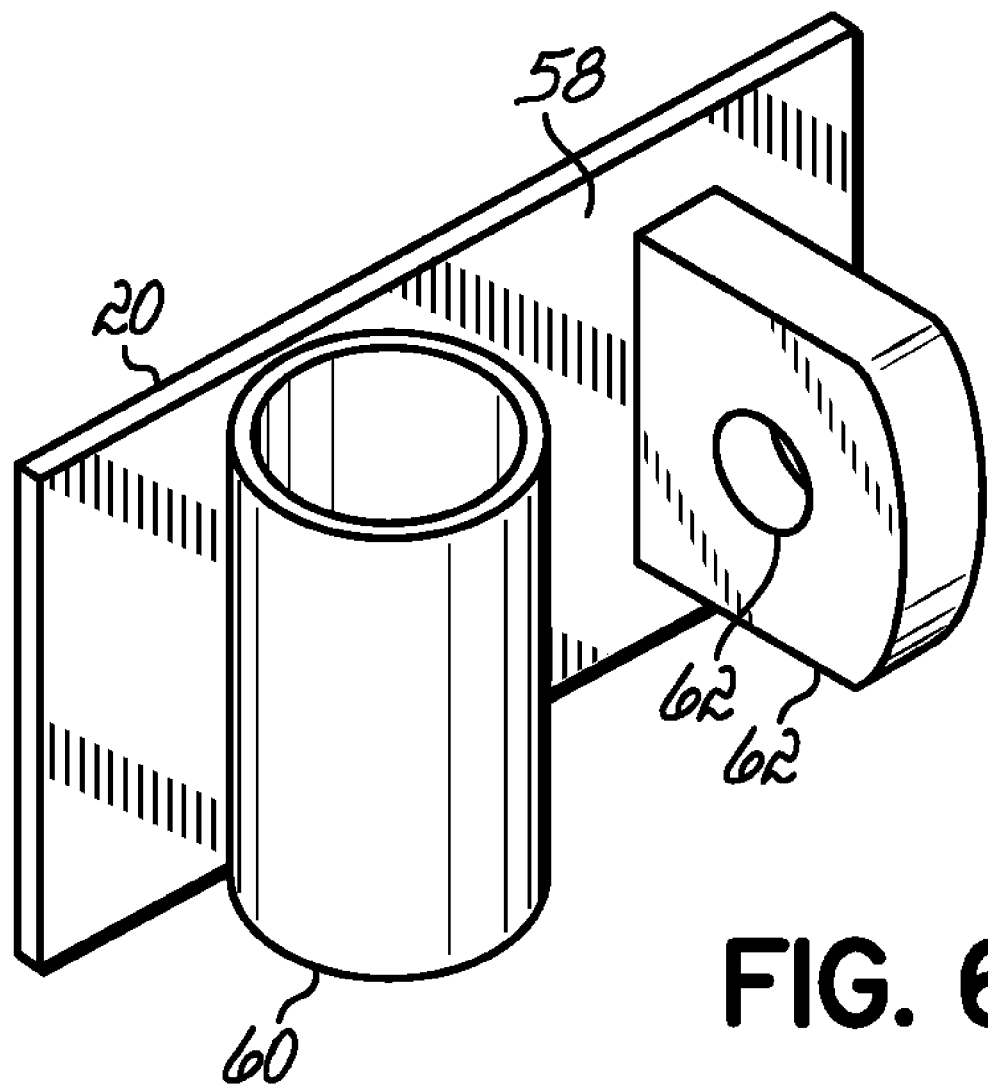
FIG. 6 is a perspective view of an upper anchor element.

FIGS. 4-6 show the interior structural elements of one device half 16a in more detail. In this embodiment the upper anchor element 20 is a hinge-style anchor that allows the upper rigid member 22 to only pivot in one plane away from the rear surface 12. The upper anchor element 20 also has a storage element 60 such as a sleeve adapted to hold the lower rigid member 26 when the aerodynamic device 10 is retracted. For example, the upper anchor element 20 in the embodiment shown in FIG. 6 comprises a base plate 58, the storage element 60, and a generally flat projection 62 extending perpendicular to the base plate 58 and having a pin hole 64 cut there through. The upper rigid member 22 has a first end 42 adapted to couple the upper rigid member 22 to the upper anchor element 20. In the embodiment of FIG. 4, the first end 42 of the upper rigid member 22 comprises at least two generally flat legs 63 with at least one pin hole 65 cut through each leg 63. The flat legs 63 then fit over the flat projection 62 so that a pin can be inserted through pin holes 64 and 65 to pivotally couple the upper rigid member 22 to the upper anchor element 20. The upper rigid member 22 has a second end 44 that is rotatably attached to the angled connection element 24 such that it is free to rotate around the long axis of the upper rigid member 22.

The angled connection element 24 has a pin slot 46 on the opposite end from the connection to the upper rigid member 22. As shown in FIG. 4, the angled connection element 24 is a hinge joint comprising two element halves 23, 25, each including at least one leg 27, 29, respectively, and a hinge pin 31 coupling the legs 27, 29 of the respective element halves 23, 25. The element halves 23, 25 can then rotate in one plane about the hinge pin 31. One skilled in the art will appreciate that the angled connection element 24 could also be a solid angled joint without this hinging capability. The lower anchor element 28 is attached to the lower perimeter of the door 13 or rear surface 12 and comprises an operational sleeve 48 and a storage element 50 such as a sleeve, each designed to accept the lower rigid member 26. The operational sleeve 48 and the storage element 50 each have a pin slot 47 as shown in FIG. 5. The lower rigid member 26 has a pin 52 near each end designed to fit into the pin slots 46, 47 on the angled connection element 24 and the lower anchor element 28. It will be appreciated by one skilled in the art that alternate locking pin mechanisms can be used in this arrangement, including a pin slot being cut into the lower rigid member 26 and an internal pin on the interior surface of the lower anchor element 28 adapted to engage that pin slot. It will further be appreciated by one skilled in the art that the storage element 60 of the upper anchor element 20 and the operational sleeve 48 and storage element 50 of the lower anchor element 28 may include flanges adapted to allow the lower rigid member 26 to enter the sleeve or element(s) even if not exactly angled correctly.

The invention also contemplates a method for constructing or deploying the aerodynamic device 10. First the flexible sheet 18 is connected to connection points 32, 34, 36, 38 around the perimeter of the rear surface 12. Next the upper rigid member 22 is slid into the sleeve 17 of the flexible sheet 18, and the lower rigid member 26 is similarly slid into the sleeve 19 of the flexible sheet 18. Then the first end 42 of the upper rigid member 22 is coupled to the upper anchor element 20 as described previously. The lower rigid member 26 is then inserted as shown by arrow 72 into the operational sleeve 48 of the lower anchor element 28 with the pin 52 on the lower rigid member 26 entering the pin slot 47 on the lower anchor element 28. The upper rigid member 22 is pivoted away from the rear surface 12 of the vehicle 14 and the angled connection element 24 is rotated around the other end of the upper rigid member 22 to line up the pin slot 46 on the angled connection element 24 with the pin 52 on the other end of the lower rigid member 26. Once the lower rigid member 26 is fully inserted as shown by arrows 72, 74 into both the angled connection element 24 and the lower anchor element 28, the lower rigid member 26 is rotated so that the pins 52 lock into the ends of the pin slots 46, 47. After these steps have been completed for both device halves 16a, 16b, the aerodynamic device 10 has been deployed.

To retract or stow away the aerodynamic device 10 when a truck arrives at a loading dock, for example, the following steps may be taken. First the removable connection point 38 of the flexible sheet 18 must be detached from the rear surface 12 of the vehicle 14. Next the lower rigid member 26 is removed from the angled connection element 24 and the lower anchor element 28 by twisting the pins 52 out of the respective pin slots 46, 47. The lower rigid member 26 is then slid out of the sleeve 19 of the flexible sheet 18. The lower rigid member 26 is then stored in the storage elements 50, 60 and locked into the pin slot 47 of storage element 50 to lie flat against the rear surface 12. Finally, the upper rigid member 22 pivots downward toward the rear surface 12 of the vehicle 14, and the angled connection element 24 can be rotated to lie flat against the rear surface 12. Now the entire aerodynamic device 10 is lying flat against the rear surface 12 and access to the door handles 15 is available. This method can be repeated for both device halves 16a, 16b at a loading dock.

Figure 7:
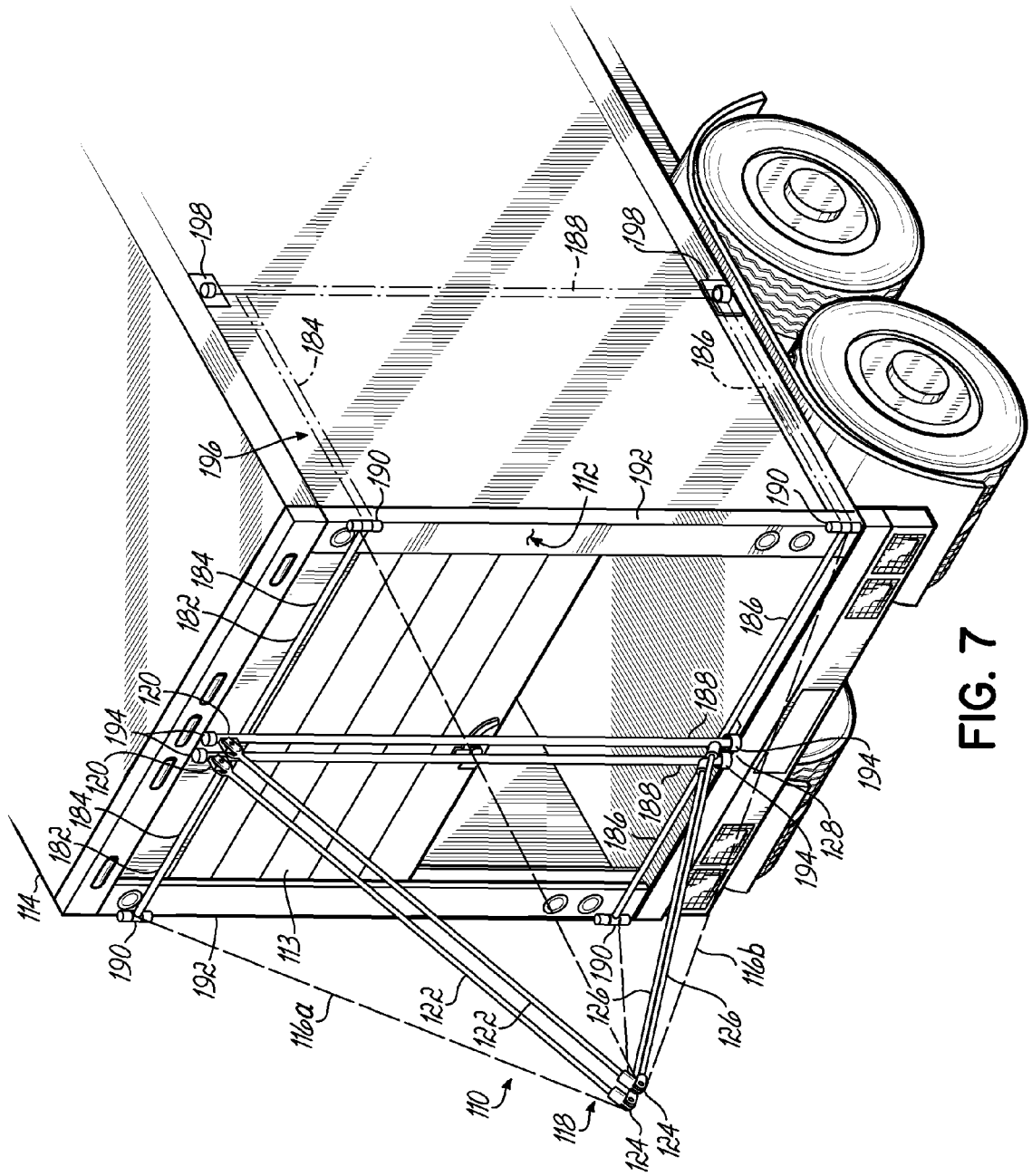
FIG. 7 is a perspective view of another embodiment of the invention adapted to work with roll-up style doors.

Another embodiment of the invention shown in FIG. 7 is adapted to work with vehicles having roll-up style doors 113. In this embodiment, an aerodynamic device 110 has generally the same elements as the embodiment shown in FIGS. 1-6, but additional elements and features are described as follows. Each device half 116a, 116b now further comprises a mounting frame 182 which includes an upper frame member 184, a lower frame member 186, and a vertical frame member 188. The upper and lower frame members 184, 186 are coupled to hinges 190 on a side edge 192 of the rear surface 112. The vertical frame member 188 holds each device half 116a, 116b in place by coupling to brackets 194 located on the rear surface 112. Side brackets 198 on the side surface 196 are used to secure the device half 116b to the side surface 196 when the device half 116b is swung away from the rear surface 112 (as shown in phantom).

Instead of attaching to the rear surface 112, the upper and lower anchor elements 120, 128 attach directly to the mounting frame 182. Similarly, the flexible sheet 118 connects to the mounting frame 182 rather than the rear surface 112. The flexible sheet 118, upper rigid member 122, angled connection element 124, and lower rigid member 126 assemble and disassemble in generally the same manner as the other embodiment described above. When the elements are stowed flat against the mounting frame 182, the entire device halves 116a, 116b can be rotated 270 degrees around the side edge 192 and locked flat against the side surface 196 using brackets 198. This embodiment maintains the functionality of both the aerodynamic device 110 and the roll-up style door 113.

Figure 8:
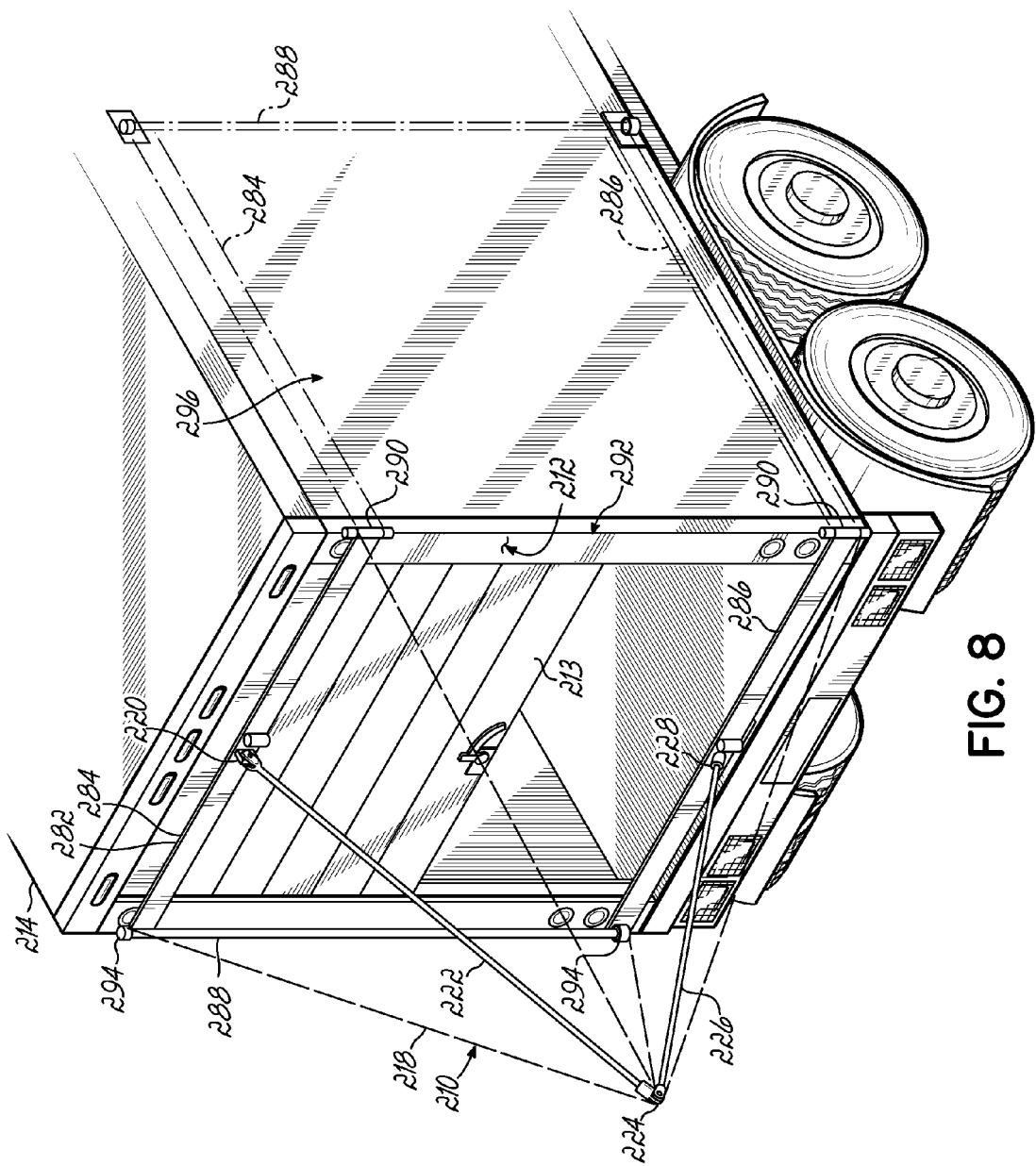
FIG. 8 is a perspective view of another embodiment of the invention adapted to work with roll-up style doors.

Another embodiment of the invention shown in FIG. 8 is adapted to work with vehicles having roll-up style doors 213. In this embodiment, an aerodynamic device 210 has many of the same elements and characteristics of the above-described embodiments, but the two device halves 16a, 16b are replaced with a single mechanical assembly of elements attached to a single, albeit larger, mounting frame 282. The larger mounting frame 282 again has an upper frame member 284, a lower frame member 286, and a vertical frame member 288. The upper and lower frame members 284, 286 are coupled to hinges 290 on a side edge 292 of the rear surface 212. The vertical frame member 288 holds the mounting frame 282 in place by coupling to brackets 294 located on the rear surface 212. Side brackets 298 on the side surface 296 are used to secure the mounting frame 282 to the side surface 296 when the mounting frame 282 is swung away from the rear surface 212 (as shown in phantom).

Like the other embodiments, this embodiment includes an upper anchor element 220, an upper rigid member 222, an angled connection element 224, a lower rigid member 226, a lower anchor element 228, and a flexible sheet 218. Each of these elements function like those described above, but the anchor elements 220, 228 and the flexible sheet 218 now couple to the large mounting frame 282 near the center of the rear surface 212. The flexible sheet 218 is also larger in this embodiment to create a one-piece pyramid shape. Other than these new features, the device functions substantially the same as the previous embodiment described. One skilled in the art will realize the various elements and frame members of each embodiment can be made out of any suitable material.

This invention is not to be limited by what has been particularly shown and described, except as indicated by the following claims.

What is claimed is:

1. An aerodynamic device for mounting on a rear wall surface of a vehicle, the device comprising:
   first and second device halves that have a generally pyramidal shape when both halves are mounted adjacent to each other on the rear wall surface of the vehicle, each device half including:
   an upper support member having first and second ends, the first end being adapted to connect to an upper horizontal perimeter of the rear wall surface;
   a lower support member having first and second ends, the first end being adapted to connect to a lower horizontal perimeter of the rear wall surface, the second end of the lower support being operatively connected to the second end of the upper support member; and
   a flexible sheet connected along at least a portion of the upper support member and along at least a portion of the lower support member, the flexible sheet having first and second spaced-apart connection points, the first connection point adapted to connect to the upper horizontal perimeter of the rear wall surface in spaced relation to the first end of the upper support member, the second connection point adapted to connect to the lower horizontal perimeter of the rear wall surface in spaced relation to the first end of the lower support member;
   wherein the flexible sheet forms a generally half-pyramidal shape when the flexible sheet and the upper and lower support members are connected to the rear wall surface of the vehicle and wherein each device half lies generally flat against the rear wall surface when the lower support member is disconnected from the upper support member and the lower horizontal perimeter of the rear wall surface.

2. The aerodynamic device of claim 1, wherein each device half further includes an upper anchor element, the first end of the upper support member being pivotally connected to the upper anchor element, the upper anchor element adapted to mount to the upper horizontal perimeter of the rear wall surface.

3. The aerodynamic device of claim 2, wherein the upper anchor element includes a storage element, the storage element configured to receive and hold the lower support member when the device half is disassembled.

4. The aerodynamic device of claim 1, wherein each device half further includes a lower anchor element, the first end of the lower support member being removably connected to the lower anchor element, the lower anchor element adapted to mount to the lower horizontal perimeter of the rear wall surface.

5. The aerodynamic device of claim 4, wherein the lower anchor element includes a storage element, the storage element configured to receive and hold the lower support member when the device half is disassembled.

6. The aerodynamic device of claim 1, wherein the upper and lower support members have approximately the same length as the vertical distance between the upper and lower horizontal perimeter on the rear wall surface of the vehicle.

7. The aerodynamic device of claim 1, wherein the flexible sheet includes first and second sleeves, the upper support member being disposed through the first sleeve and the lower support member being disposed through the second sleeve when the device half is mounted on the rear wall surface of the vehicle.

8. A method for installing one device half of an aerodynamic device onto a rear wall surface of a vehicle, where the device half includes upper and lower support members and a flexible sheet with first and second spaced-apart connection points, comprising:
   affixing the flexible sheet to a portion of the upper support member;
   connecting a first end of the upper support member to the upper horizontal perimeter of the rear wall surface of the vehicle;
   affixing the flexible sheet to a portion of the lower support member;
   connecting a first end of the lower support member to the lower horizontal perimeter of the rear wall surface of the vehicle;
   connecting a second end of the upper support member to a second end of the lower support member;
   connecting the flexible sheet at the first connection point to the upper horizontal perimeter of the rear wall surface; and
   connecting the flexible sheet at the second connection point to the lower horizontal perimeter of the rear wall surface;
   wherein the flexible sheet forms a generally half-pyramidal shape once the device half is installed and wherein the device half lies generally flat against the rear wall surface when the lower support member is disconnected from the upper support member and the lower horizontal perimeter of the rear wall surface.

9. An aerodynamic device for mounting on a rear wall surface of a vehicle, the device comprising:
   first and second device halves that have a generally pyramidal shape when both halves are mounted adjacent to each other on the rear wall surface of the vehicle, each device half including:
   a mounting frame including an upper horizontal frame member having first and second ends, a lower horizontal frame member having first and second ends, and a vertical frame member with upper and lower ends, the upper end being connected to first end of the upper horizontal frame member, the lower end being connected to the first end of the lower horizontal frame member, each of the second ends of the upper and lower horizontal frame members are adapted to pivotally mount to a side edge of the rear wall surface of the vehicle so that the mounting frame can swing away from the rear wall surface;
   an upper support member having first and second ends, the first end being removably connected to the upper end of the vertical member;
   a lower support member having first and second ends, the first end being removably connected to the lower end of the vertical member, the second end of the lower support being removably connected to the second end of the upper support member; and
   a flexible sheet removably connected along a portion of the upper support member, a portion of the lower support member, a portion of the upper horizontal frame member, and the lower horizontal frame member;
   wherein the flexible sheet forms a generally half-pyramidal shape when the flexible sheet and the upper and lower support members are connected to the mounting frame.

10. The aerodynamic device of claim 9, wherein each device half further includes an upper anchor element, the first end of the upper support member being pivotally connected to the upper anchor element, the upper anchor element adapted to connect to the mounting frame.

11. The aerodynamic device of claim 10, wherein the upper anchor element includes a storage element, the storage element configured to receive and hold the lower support member when the device half is disassembled.

12. The aerodynamic device of claim 9, wherein each device half further includes a lower anchor element, the first end of the lower support member being removably connected to the lower anchor element, the lower anchor element adapted to connect to the mounting frame.

13. The aerodynamic device of claim 12, wherein the lower anchor element includes a storage element, the storage element configured to receive and hold the lower support member when the device half is disassembled.

* * * * *